(12) United States Patent
Zhang

(10) Patent No.: US 8,065,812 B2
(45) Date of Patent: Nov. 29, 2011

(54) DETECTING APPARATUS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 189 days.

(21) Appl. No.: 12/510,279

(22) Filed: Jul. 28, 2009

(65) Prior Publication Data
US 2010/0212173 A1 Aug. 26, 2010

(30) Foreign Application Priority Data

Feb. 26, 2009 (CN) .......................... 2009 1 0300586

(51) Int. Cl.
*G01B 5/25* (2006.01)
(52) U.S. Cl. .......................................... 33/533; 33/551
(58) Field of Classification Search .................. 33/533, 33/549, 551, 553, 555, 556, 559, 568, 573, 33/503–504, 1 M, 1 N
See application file for complete search history.

(56) References Cited

U.S. PATENT DOCUMENTS

| | | | | |
|---|---|---|---|---|
| 3,217,418 A * | 11/1965 | Wennerberg | ................. | 33/543 |
| 3,780,441 A * | 12/1973 | Kunert | ...................... | 33/543 |
| 4,251,922 A * | 2/1981 | Perlotto | ..................... | 33/548 |
| 4,736,313 A * | 4/1988 | Nishimura et al. | ......... | 702/162 |
| 5,136,285 A * | 8/1992 | Okuyama | ................. | 340/870.11 |
| 5,207,007 A * | 5/1993 | Cucinotta et al. | ............. | 33/640 |
| 5,339,534 A * | 8/1994 | Krayenhagen | ................. | 33/533 |
| 5,539,992 A * | 7/1996 | Woodhouse | ................. | 33/533 |
| 5,826,345 A * | 10/1998 | Hendricks | ..................... | 33/365 |
| 6,195,905 B1 * | 3/2001 | Cole | ............................. | 33/640 |
| 6,497,047 B1 * | 12/2002 | Miyagawa et al. | ............. | 33/533 |
| 6,671,973 B2 * | 1/2004 | Takemura et al. | ............. | 33/551 |
| 7,624,512 B2 * | 12/2009 | Zhang et al. | ................. | 33/555.1 |
| 7,743,525 B2 * | 6/2010 | Zhang et al. | ..................... | 33/533 |
| 7,779,550 B2 * | 8/2010 | Li et al. | ............................. | 33/533 |
| 7,857,295 B2 * | 12/2010 | Zhang et al. | ................. | 269/152 |
| 2009/0106995 A1 * | 4/2009 | Zhang et al. | ..................... | 33/533 |
| 2010/0242294 A1 * | 9/2010 | Zhang | ............................ | 33/573 |
| 2011/0036184 A1 * | 2/2011 | Zhang | ..................... | 73/862.621 |

* cited by examiner

*Primary Examiner* — G. Bradley Bennett
*Assistant Examiner* — Tania Courson
(74) *Attorney, Agent, or Firm* — Altis Law Group, Inc.

(57) ABSTRACT

A detecting apparatus for detecting linearity of an object includes a platform, a slide rail vertically extending from the platform, two standard units slidably mounted to the slide rail, and a detecting unit. The detecting unit includes a mounting block slidably mounted to the slide rail, a test dial indicator fixed to the mounting block and including an elastically extendable spindle, and a detecting bar slidably mounded to the mounting block via a resilient member. The standard units are used to abut against the object to cooperatively define a detection reference plane. A first end of the detecting bar abuts against by the spindle of the test dial indicator, and a second end of the detecting bar is used to contact the object.

17 Claims, 5 Drawing Sheets

DETECTING APPARATUS

BACKGROUND

1. Technical Field

The present disclosure relates to detecting apparatuses, and more particularly to a detecting apparatus for detecting linearity of an object.

2. Description of Related Art

Typically, bevel edge rulers or three coordinate measuring machines are utilized for detecting linearity of objects. However, using a bevel edge ruler can not quantify the detecting result. Using a three coordinate measuring machine can quantify the detecting result, but in detecting an object, especially an object made of the thin material, detecting heads of the three coordinate measuring machine easily causes the object deforming, which will distort the detecting result.

DETAILED DESCRIPTION

Figure 1:
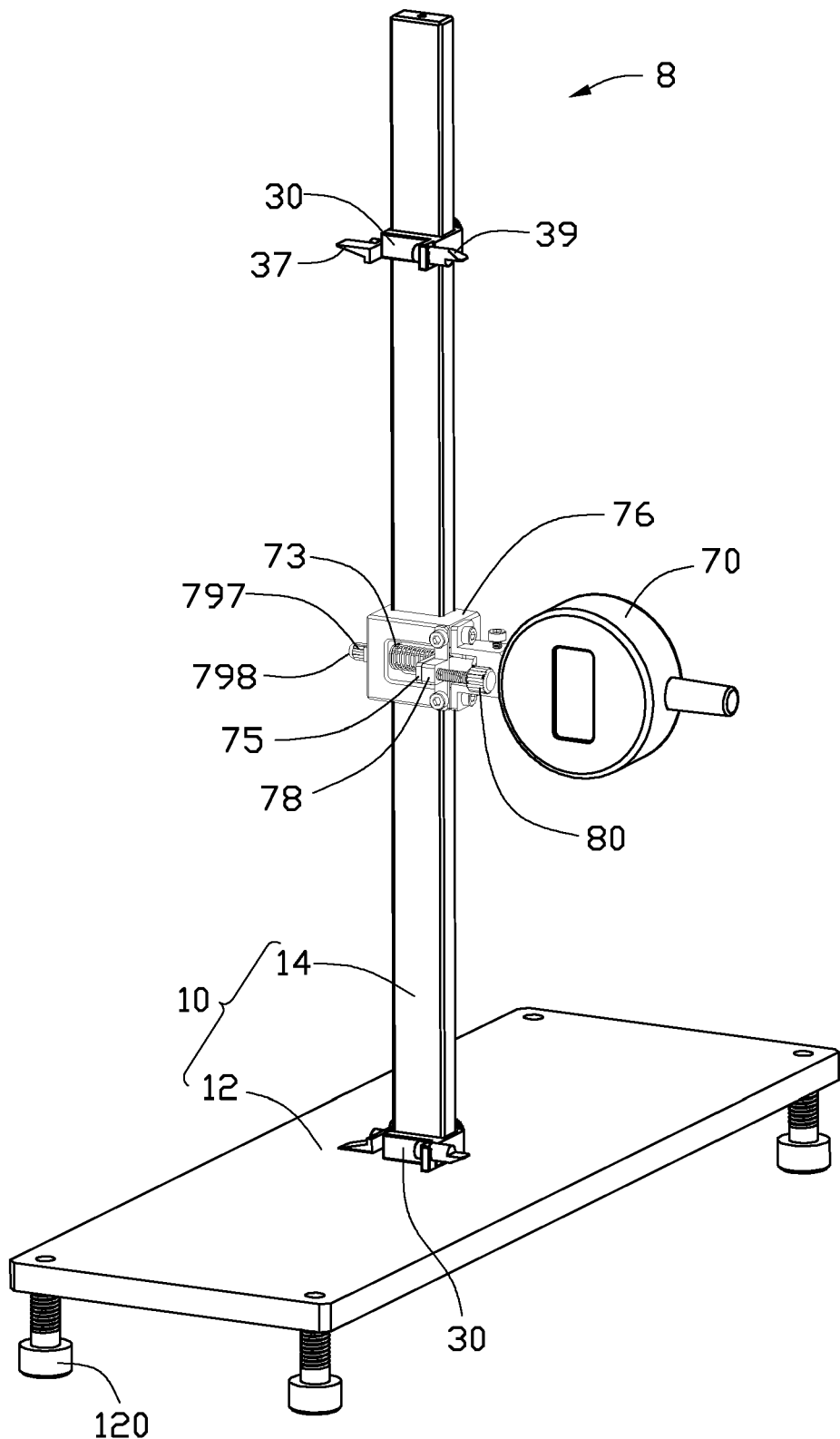
FIG. 1 is an isometric view of an embodiment of a detecting apparatus, the detecting apparatus including two standard units and a detecting unit.

Referring to FIG. 1, an embodiment of a detecting apparatus 8 includes a supporting member 10, two standard units 30, and a detecting unit 70.

The supporting member 10 includes a platform 12, and a slide rail 14 vertically extending up from the platform 12. Four support poles 120 extend from a bottom of the platform 12, opposite to the slide rail 14. A cross section of the slide rail 14 is rectangular-shaped.

Figure 2:
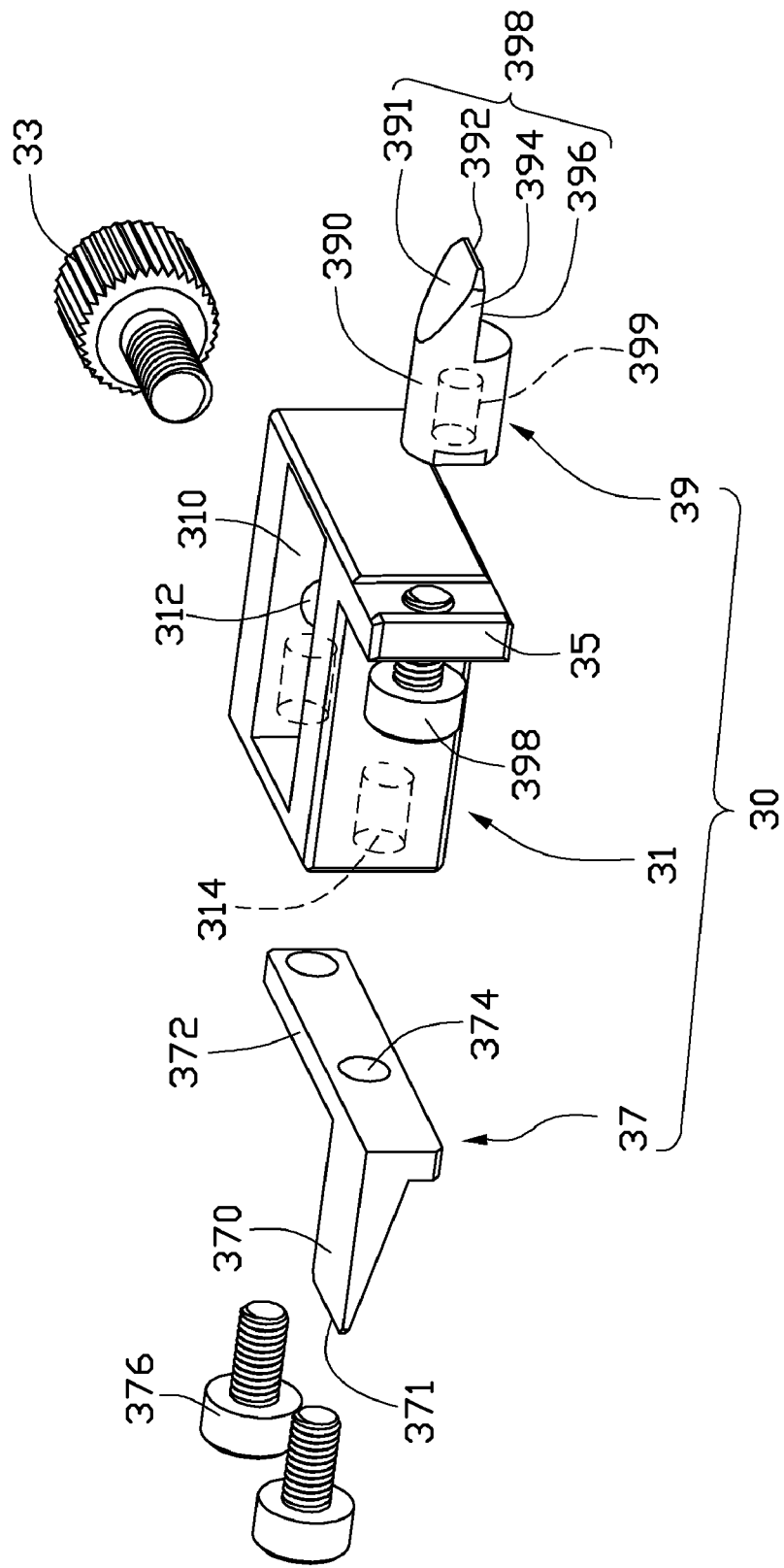
FIG. 2 is an exploded, isometric view of one of the standard units of FIG. 1.

Referring to FIG. 2, the two standard units 30 are the same. Each standard unit 30 includes a main body 31, a first reference element 37, and a second reference element 39.

The main body 31 is generally rectangular-shaped. A rectangular through hole 310 is defined in a center, through a top and a bottom of the main body 30. A through screw hole 312, communicating with the through hole 310, is define in a first side of the main body 30. A fixing piece 35 extends from a second side opposite to the first side of the main body 30, and is adjacent to a first end of the main body 30. The fixing piece 35 defines a through hole (not labeled) for a screw 398 inserting therethrough. Two screw holes 314 are defined in a second end opposite to the first end of the main body 30.

The first reference element 37 includes an elongated fixing portion 372, and a wedge-shaped reference portion 370 perpendicularly extending from a first end of the fixing portion 372. The reference portion 370 includes a thin tip end 371 away from the fixing portion 372. Two through holes 374, corresponding to the screw holes 314 of the main body 30, are defined in the fixing portion 372, wherein one of the through holes 374 is defined in a middle of the fixing portion 372, the other one of the through holes 374 is defined in a second end of the fixing portion 372 away from the reference portion 370.

The second reference element 39 includes a cylinder 390, and a semi-cylinder 398 extending from a first end of the cylinder 390. A screw hole 399 is defined in a second end opposite to the first end of the cylinder 390. The semi-cylinder 398 includes a circled side 394 and a flat side 396. A part of the circled side 394 is slantingly cut off to form a slanting surface 391, opposite to the flat side 396 and making a distal end of the semi-cylinder 398 as a thin tip end 392.

In assembling each standard unit 30, two screws 376 are respectively inserted into the through holes 374 of the first reference element 37, and engaged in the corresponding screw holes 314 of the main body 31, to fix the first reference element 37 to the second end of the main body 31. The screw 398 is inserted into the through hole of the fixing piece 35, and engaged in the screw hole 399 of the second reference element 39, to fix the second reference element 39 to the first end of the main body 31. The first reference element 37 and the second reference element 39 are in alignment with each other, and a direction that the tip end 371 of the first reference element 37 points to is opposite to a direction that the tip end 392 of the second reference element 39 points to. A hand screw 33 is engaged in the screw hole 312 of the main body 31.

Figure 3:
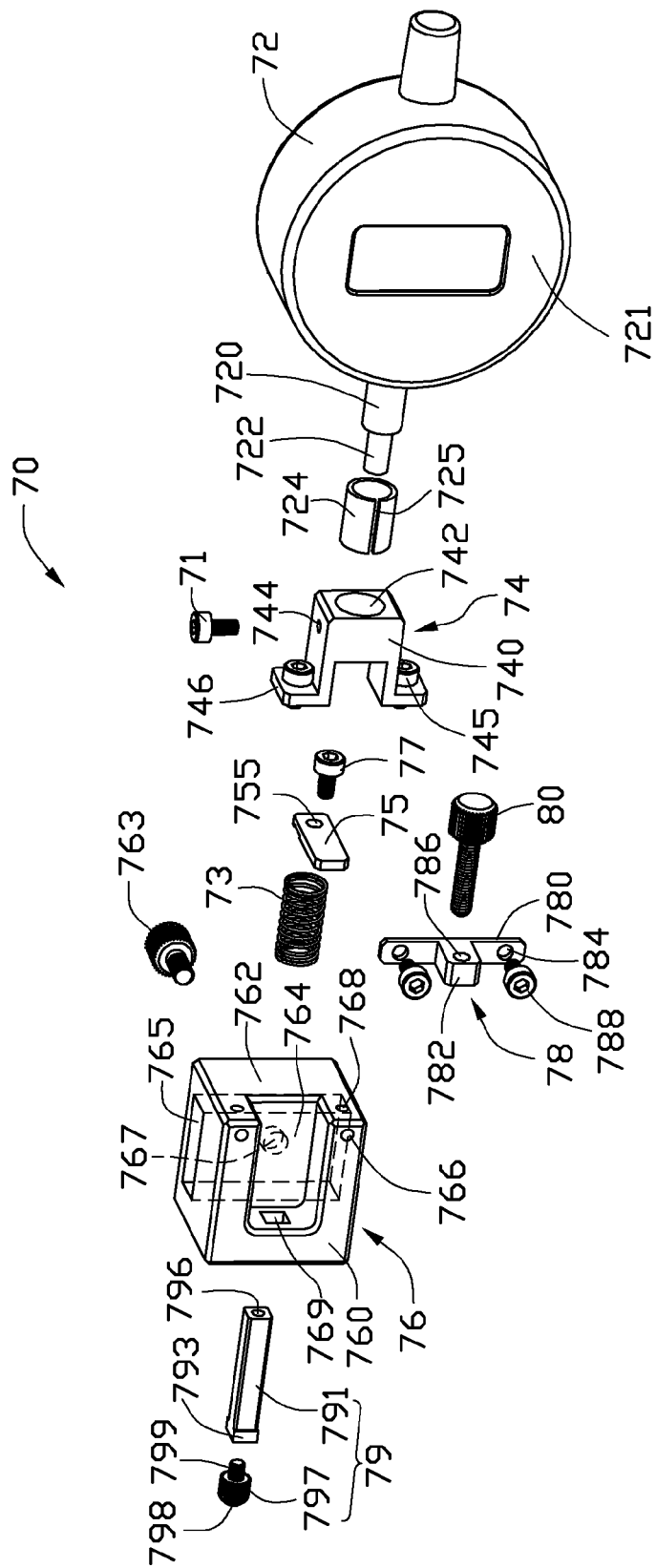
FIG. 3 is an exploded, isometric view of the detecting unit of FIG. 1.

Referring to FIG. 3, the detecting unit 70 includes a test dial indicator 72, an indicator mount 74 for mounting the test dial indicator 72, a mounting block 76, an extension body 78 fixed to the mounting block 76, a transmission body 75, a resilient member 73, and a detecting bar 79.

The test dial indicator 72 includes a rounded main body 721, a mounting portion 720 extending from the main body 721, and an elastically extendable spindle 722 extending from the main body 721 and extending through the mounting portion 720.

The indicator mount 74 includes an n-shaped main body 740, and two fixing feet 746 perpendicularly extending from distal ends of two legs of the n-shaped main body 740, respectively, towards opposite directions. A through hole 742, parallel to the legs, is defined in the main body 740 between the legs. A screw hole 744, perpendicular to the legs, is defined in the main body 740 communicating with the through hole 742. Each fixing foot 746 defines a through hole (not labeled) for a screw 745 inserting therethrough.

The transmission body 75 is an elongated piece defining a through hole 755 adjacent an end of the piece.

The mounting block 76 is generally rectangular-shaped and includes a first side surface 760, and an end surface 762 perpendicularly connecting to an end of the first side surface 760. A receiving groove 764 is defined in a middle of the first side surface 760, extending through the end surface 762. A square-shaped through hole 769 is defined in a groove wall of the receiving groove 764 opposite to the end surface 762. Two screw holes 766 are defined in the first side surface 760. The screw holes 766 are adjacent to the end surface 762. One of the screw holes 766 is located over the receiving groove 764, the other one of the screw holes 766 is located under the receiving groove 764. Two screw holes 768 are defined in the end surface 762. The screw holes 768 are adjacent to the side surface 760. One of the screw holes 768 is located over the receiving groove 764, the other one of the screw holes 768 is located under the receiving groove 764. A rectangular through hole 765 is defined in the mounting block 76 through a top and a bottom of the mounting block 76. The through hole 765 is adjacent to a second side surface opposite to the first side surface 760 of the mounting block 76. A screw hole 767, communicating with the through hole 765, is defined in the second side surface.

The extension body 78 includes an elongated fixing piece 780, and a projecting portion 782 perpendicularly extending from a middle of the fixing piece 780. Two through holes 784, corresponding to the screw holes 766 of the mounting block 76, are defined in the fixing piece 780 and located at opposite sides of the projecting portion 782. A through screw hole 786 is defined in the projecting portion 782.

The resilient member 73 is a helical spring.

The detecting bar 79 includes an elongated sliding portion 791, and a detecting portion 797. The detecting portion 797 includes a cylinder-shaped main body (not labeled), a generally semi-globular touching head 798 extending from a first end of the main body, and a screw rod 799 extending from a second end opposite to the first end of the main body. The cross section of the sliding portion 791 is square-shaped. The sliding portion 791 includes opposite first and second ends. A screw hole (not labeled) is defined in the first end of the sliding portion 791 for engaging with the screw rod 799 of the detecting portion 797. A flange 793 perpendicularly extends from and around the first end of the sliding portion 791. A screw hole 796 is defined in the second end of the sliding portion 791.

In assembling the detecting unit 70, the detecting portion 797 is fixed to the first end of the sliding portion 791 via the screw rod 799. The second end of the sliding portion 791 of the detecting bar 79 is inserted through the through hole 769 to enter into the receiving groove 764 of the mounting block 76, wherein the flange 793 of the detecting bar 79 is used to prevent the first end of the sliding portion 791 of the detecting bar 79 from entering into the through hole 769. The resilient member 73 fits about the sliding portion 791 of the detecting bar 79 and is received in the receiving groove 764 of the mounting block 76. A screw 77 is inserted through the through hole 755 of the transmission body 75 and engaged in the screw hole 796 of the detecting bar 79 to fix the transmission body 75 to the detecting bar 79. Two ends of the resilient member 73 respectively abut against the transmission body 75 and the corresponding groove wall of the receiving groove 764. Two screws 788 are inserted through the through holes 784 of the extension body 78 and engaged in the screw holes 766 of the mounting block 76, respectively, to fix the extension body 78 to the side surface 760 of the mounting block 76. The projecting portion 782 is located outside the receiving groove 764, and a portion of the transmission body 75 located outside the receiving groove 764 abuts against a side facing the detecting portion 797 of the projecting portion 782. A fine adjustment screw 80 is engaged in the screw hole 786 of the extension body 78. The two screws 745 are inserted through the corresponding through holes of the fixing feet 746 of the indicator mount 74 and engaged in the screw holes 768 of the mounting block 76, respectively, to fix the indicator mount 74 to the end face 762 of the mounting block 76. The mounting portion 720 of the test dial indicator 72 is inserted into a bush 724 axially defining a slot 725 in a circumference of the bush 724. The bush 724 together with the mounting portion 720 are inserted in the through hole 742 of the mounting block 76. The spindle 722 of the test dial indicator 72 abuts against the screw 77 fixed to the transmission body 75. A screw 71 is engaged in the screw hole 744 of the indicator mount 74 and resist against the bush 724, to shrink the slot 725, thereby securing the mounting portion 720 of the test dial indicator 72 to the indicator mount 74. The bush 724 can prevent the mounting portion 720 from being directly pressed by the screw 71. A hand screw 763 is engaged in the screw hole 767 of the mounting block 76.

In assembling the detecting apparatus 8, one of the assembled standard units 30 is slidably mounted to the slide rail 14 of the supporting member 10 via the through hole 310 of the standard unit 30 fitting about the slide rail 14. The assembled detecting unit 70 is slidably mounted to the slide rail 14 of the supporting member 10 via the through hole 765 of the mounting block 76 of the detecting unit 70 fitting about the slide rail 14. The other one of the assembled standard units 30 is slidably mounted to the slide rail 14 of the supporting member 10 via the through hole 310 of the standard unit 30 fitting about the slide rail 14. The flat sides 396 of the second reference elements 39 of the standard units 30 face each other, and the first reference elements 37 of the standard units 30 and the touching head 798 of the detecting unit 70 are located at a same side of the slide rail 14.

In use, the standard units 30 are slid to desired height levels according to an object that is to be detected by the detecting apparatus 8, and the standard units 30 are fixed at the height levels via tightening the hand screws 33. The detecting unit 70 is fixed at a height level via tightening the hand screw 763. The detecting apparatus 8 can be used to detect linearity of a flat object or an object with bended edges. Hereinafter, a flat object 100 with bended edges 101 (see FIGS. 4 and 5) is taken as an example to introduce how to use the detecting apparatus 8.

Figure 4:
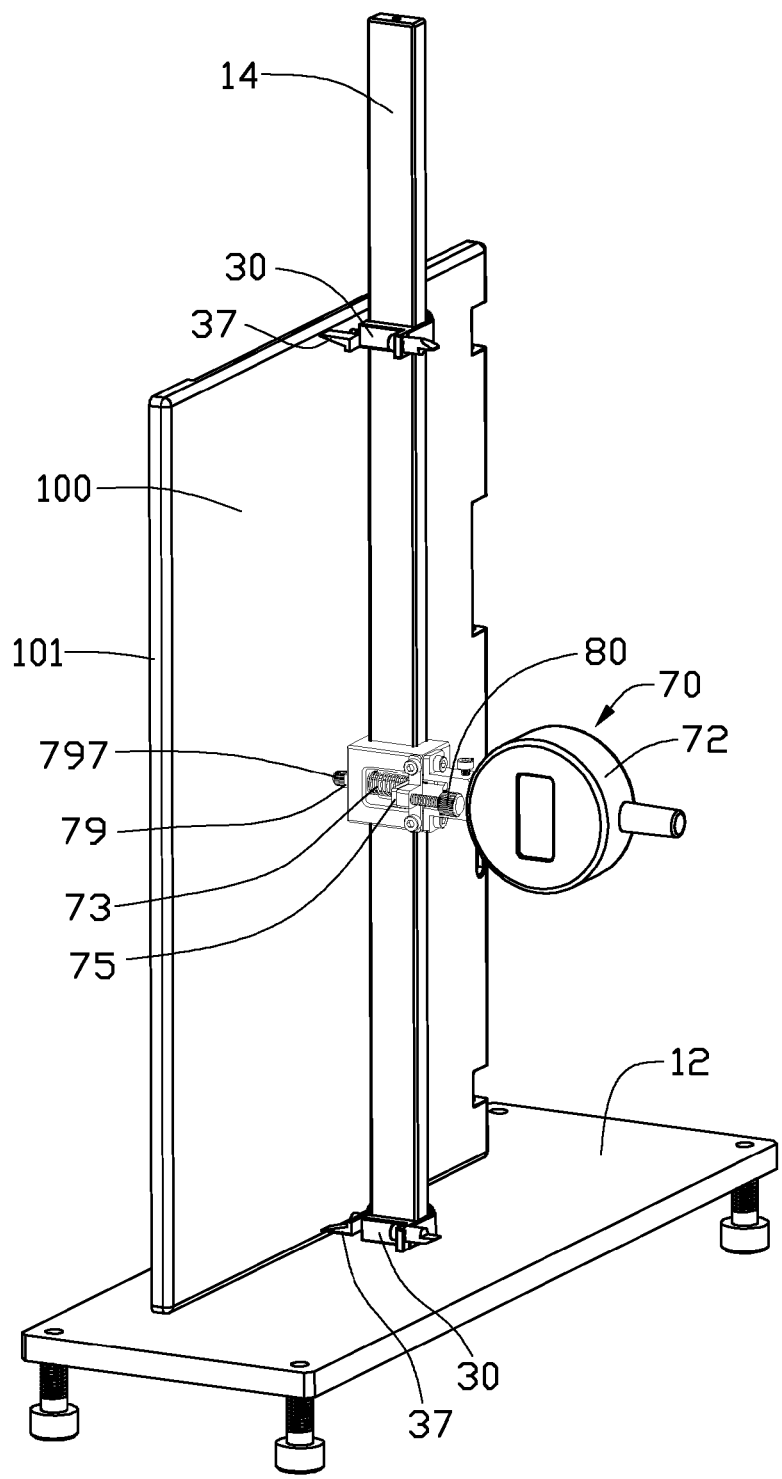
FIGS. 4 and 5 are assembled views showing the detecting apparatus in use.

Referring to FIG. 4, in one embodiment, the first reference elements 37 of the standard units 30 are used to position the object 100, and the detecting unit 70 is used to detect the object 100. A detailed process is shown in the next paragraph.

Before detecting, an extending distance of the detecting bar 79 relative to the mounting block 76 of the detecting unit 70 is adjusted via rotation of the fine adjustment screw 80, in order to substantially align the touching head 798 of the detecting bar 79 and the tip ends 371 of the first reference elements 37. A lower end of the object 100 abuts against the platform 12. A side of the object 100, which does not include the bended edges 101, abuts against the tip ends 371 of the first reference elements 37 and the touching head 798 of the detecting bar 79. Here, the tip ends 371 of the first reference elements 37 are adjacent to upper and lower ends of the object 100 and cooperatively define a detection reference plane for the object 100. The object 100 is manually supported to prevent from falling over. The detecting unit 70 is slid along the slide rail 14. Because the detecting bar 79 is biased by the resilient member 73, the extending distance of the detecting bar 79 relative to the mounting block 76 will be changed as the corresponding surface of the object 100 undulates. Because the spindle 722 of the test dial indicator 72 is elastically extendable and abuts against the detecting bar 79, the spindle 722 will extend or retract as the detecting bar 79 extends or retracts. Because an extending or retracting distance of the spindle 722 together with the detecting bar 79 can be indicated by a meter panel of the test dial indicator 72, an offset distance of any detected point of the object 100 relative to the detection reference plane can be known. Therefore, linearity of the object 100 can be known.

Figure 5:
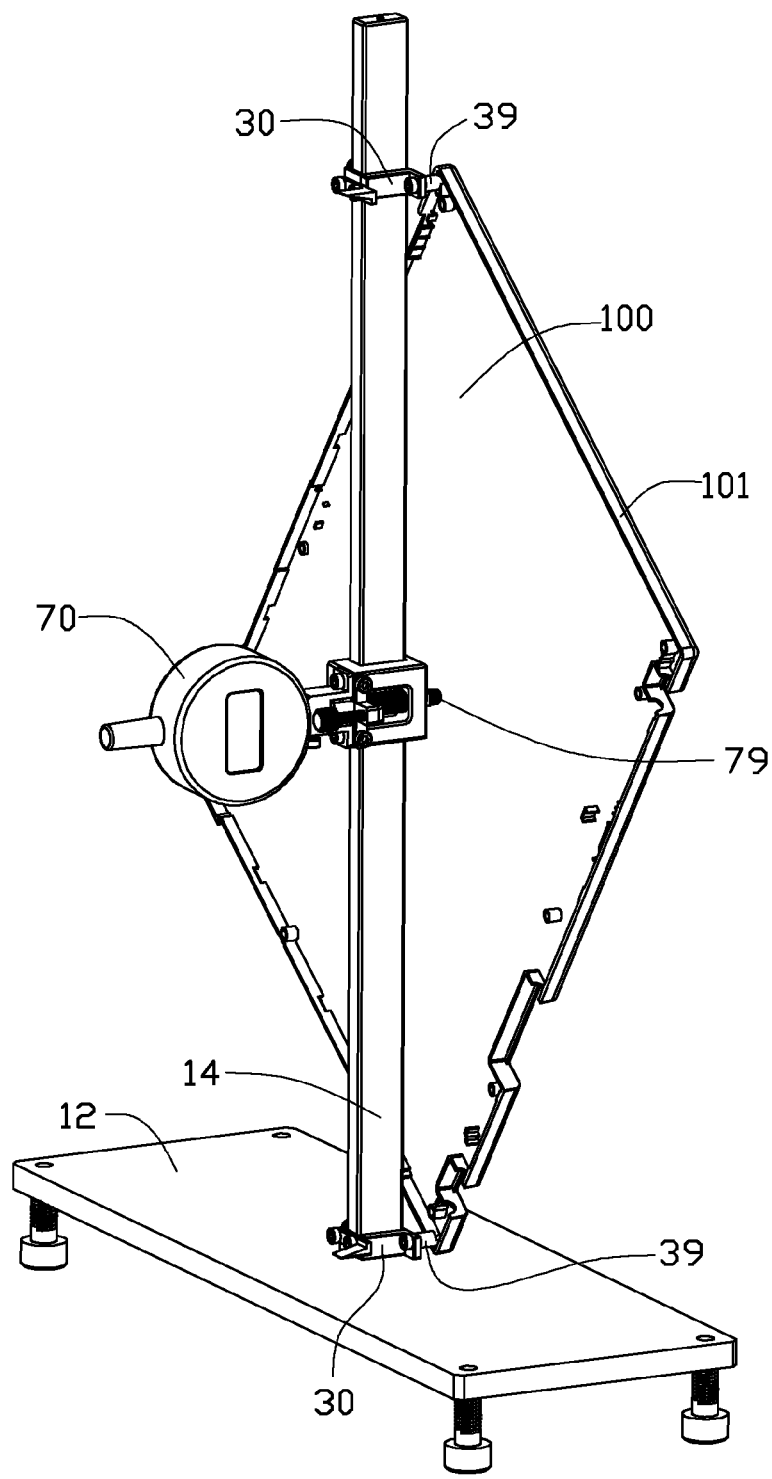

Referring to FIG. 5, in another embodiment, the second reference elements 39 of the standard units 30 are used to position the object 100, and the detecting unit 70 is used to detect the object 100. A detailed process is shown in the next paragraph.

Before detecting, the upper one of the standard units 30 and the detecting unit 70 are disassembled from the slide rail 14, and then reassembled to the slide rail 14, in order to put the second reference elements 39 of the standard units 30 and the touching head 798 of the detecting unit 70 at a same side of the slide rail 14. The extending distance of the detecting bar 79 relative to the mounting block 76 of the detecting unit 70 is adjusted, in order to substantially align the touching head 798 of the detecting bar 79 and the tip ends 392 of the second reference elements 39. A side of the object 100, which includes the bended edges 101, faces the slide rail 14. The second reference elements 39 are respectively received in two corners located at opposite ends of a diagonal line of the object 100, while the tip ends 392 of the second reference elements 39 abut against the object 100. Here, the tip ends 392 cooperatively define a detection reference plane for the object 100. Therefore, linearity of the diagonal line of the object 100 can be detected.

It is noted that the tip ends 371 of the first reference elements 37 and the tip ends 392 of the second reference elements 39 should be processed to be as flat and thin as possible, so as to reduce contacting area when the tip ends 371 or 392 abut against the object 100, in order to prevent the object 100 from being deformed by the tip ends 371 or 392. Therefore, detecting accuracy can be advanced.

It is noted that the semi-globular touching head 798 achieves point contact between the detecting unit 70 and the object 100, which can improve detecting accuracy.

It is noted that the first reference elements 37 and the second reference elements 39 are dismountable from the standard units 30. Therefore, the first reference elements 37 and the second reference elements 39 can be replaced by other reference elements to fit other objects with different shapes and/or sizes.

It is obvious that the first reference elements 37 or the second reference elements 39 may be independently utilized. Therefore, in other embodiments, the first reference elements 37 or the second reference elements 39 may be omitted.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A detecting apparatus for detecting linearity of an object, the detecting apparatus comprising:
    a platform;
    a slide rail vertically extending from the platform;
    two standard units slidably mounted to the slide rail and abutting against the object to cooperatively define a detection reference plane for the object; and
    a detecting unit comprising a mounting block slidably mounted to the slide rail, a test dial indicator fixed to the mounting block and comprising an elastically extendable spindle, a detecting bar comprising a sliding portion and a detecting portion, and a resilient member biasing the detecting bar, wherein the sliding portion is slidably mounded to the mounting block and comprises opposite first and second ends, the detecting portion is mounted to the first end and contacts the object, and the second end abuts against the spindle.

2. The detecting apparatus of claim 1, wherein each of the standard units comprises a main body defining a through hole, the standard unit is slidable along the slide rail via the slide rail being inserted though the through hole, a first screw hole is defined in the main body and communicates with the through hole, and a screw is engaged in the screw hole and is operable to be tightened to abut against the slide rail.

3. The detecting apparatus of claim 2, wherein each of the standard units comprises a reference element, the reference element comprises a fixing portion dismountably fixed to the main body and a reference portion extending from the fixing portion, and the reference portion comprises a tip end to abut against the object.

4. The detecting apparatus of claim 3, wherein the reference portion of each reference element is wedge-shaped.

5. The detecting apparatus of claim 2, wherein each of the standard units comprises a reference element dismountably fixed to the main body, and an end of the reference element away from the main body forms a tip end to abut against the object.

6. The detecting apparatus of claim 5, wherein each reference element comprises a cylinder dismountably fixed to the main body and a semi-cylinder extending from the cylinder, and a distal end of the semi-cylinder forms the tip end.

7. The detecting apparatus of claim 1, wherein the detecting portion of the detecting bar comprises a touching head to contact the object in a point contact manner.

8. The detecting apparatus of claim 7, wherein the touching head is generally semi-globular.

9. The detecting apparatus of claim 1, wherein the mounting block of the detecting unit defines a first through hole, and the mounting block is slidable along the slide rail via the slide rail being inserted though the first through hole.

10. The detecting apparatus of claim 9, wherein a first screw hole is defined in the mounting block and communicates with the first through hole, and a screw is engaged in the first screw hole and is operable to be tightened to abut against the slide rail.

11. The detecting apparatus of claim 10, wherein the mounting block is generally rectangular-shaped and comprises a side surface, a first end surface perpendicularly connecting to a first end of the side surface, and a second end surface perpendicularly connecting to a second end opposite to the first end of the side surface, the side surface and the second end surface cooperatively define a receiving groove, the first end surface defines a second through hole communicating with the receiving groove, the sliding portion of the detecting bar is slidable along the second through hole, the second end of the sliding portion is received in the receiving groove, and the first end with the detecting portion of the sliding portion is inserted through the second through hole to an outside of the mounting block.

12. The detecting apparatus of claim 11, wherein a flange extends from and around the first end of the sliding portion, to prevent the first end from entering the second through hole.

13. The detecting apparatus of claim 11, wherein a transmission body is fixed to the second end of the sliding portion, the resilient member is a spring fitting about the sliding portion, and opposite ends of the spring respectively abut against the transmission body and the mounting block.

14. The detecting apparatus of claim 13, wherein an extension body defining a second screw hole is fixed to the side surface of the mounting block, and a fine adjustment screw is engaged in the second screw hole and operable to adjust the sliding portion via the extension body.

15. The detecting apparatus of claim 14, wherein a third screw hole is defined in the first end of the sliding portion of the detecting bar, and the detecting portion comprises a screw rod engaged in the third screw hole.

16. A detecting apparatus for detecting linearity of an object, the detecting apparatus comprising:
    a platform;
    a slide rail vertically extending from the platform;
    two standard units slidably mounted to the slide rail to abut against the object to cooperatively define a detection reference plane for the object; and
    a detecting unit comprising a mounting block slidably mounted to the slide rail, a test dial indicator fixed to the mounting block and comprising an elastically extendable spindle, a detecting bar comprising a sliding portion and a detecting portion, and a resilient member biasing the detecting bar, wherein the sliding portion is slidably mounded to the mounting block and comprises opposite first and second ends, the detecting portion is mounted to the first end to contact the object, and the second end abuts against the spindle; and wherein the detecting portion of the detecting bar comprises a touching head to contact the object in a point contact manner.

17. A detecting apparatus for detecting linearity of an object, the detecting apparatus comprising:

a platform;

a slide rail vertically extending from the platform;

two standard units slidably mounted to the slide rail to abut against the object to cooperatively define a detection reference plane for the object; and a detecting unit comprising a mounting block slidably mounted to the slide rail, a test dial indicator fixed to the mounting block and comprising an elastically extendable spindle, a detecting bar comprising a sliding portion and a detecting portion, and a resilient member biasing the detecting bar, wherein the sliding portion is slidably mounded to the mounting block and comprises opposite first and second ends, the detecting portion is mounted to the first end to contact the object, and the second end abuts against the spindle;

wherein the mounting block of the detecting unit defines a first through hole, the mounting block is slidable along the slide rail via the slide rail being inserted though the first through hole, a first screw hole is defined in the mounting block and communicates with the first through hole, a screw is engaged in the first screw hole and is operable to be tightened to abut against the slide rail, the mounting block is generally rectangular-shaped and comprises a side surface, a first end surface perpendicularly connecting to a first end of the side surface, and a second end surface perpendicularly connecting to a second end opposite to the first end of the side surface, the side surface and the second end surface cooperatively define a receiving groove, the first end surface defines a second through hole communicating with the receiving groove, the sliding portion of the detecting bar is slidable along the second through hole, the second end of the sliding portion is received in the receiving groove, and the first end with the detecting portion of the sliding portion is inserted through the second through hole to an outside of the mounting block.

* * * * *